United States Patent [19]

Hughes et al.

[11] Patent Number: 5,216,099
[45] Date of Patent: Jun. 1, 1993

[54] LOW MOLECULAR WEIGHT WATER SOLUBLE PHOSPHINATE AND PHOSPHONATE CONTAINING POLYMERS

[75] Inventors: Kathleen A. Hughes; Graham Swift, both of Blue Bell, Pa.

[73] Assignee: Rohm and Haas Company, Philadelphia, Pa.

[21] Appl. No.: 680,713

[22] Filed: Apr. 4, 1991

Related U.S. Application Data

[62] Division of Ser. No. 371,467, Jun. 26, 1989.

[51] Int. Cl.[5] .......................... C06F 22/02; C06F 2/38
[52] U.S. Cl. .................................. 526/318.2; 526/240; 526/279; 526/317.1
[58] Field of Search ..................... 526/233, 271, 317.1, 526/318.2, 240, 279

[56] References Cited

U.S. PATENT DOCUMENTS 4,621,127 11/1986 Danzinger et al. ................. 526/233
4,774,303 9/1988 Denzinger et al. ................. 526/212

Primary Examiner—Joseph L. Schofer
Assistant Examiner—N. Sarofim
Attorney, Agent, or Firm—James C. Vouros

[57] ABSTRACT

A process to efficiently utilize the chain transfer agent hypophosphorous acid or salts in the preparation of low molecular weight polycarboxylate polymers comprising employing in process neutralization of the carboxylic acid monomers.

A low molecular weight polycarboxylate polymer containing phosphinate and phosphonate functional groups where less than 20% of the phosphorus is present in inorganic non polymeric compounds.

3 Claims, 2 Drawing Sheets

LOW MOLECULAR WEIGHT WATER SOLUBLE PHOSPHINATE AND PHOSPHONATE CONTAINING POLYMERS

This is a divisional of application Ser. No. 371,467, filed Jun. 26, 1989 now pending.

This invention relates to low molecular weight polycarboxylic acid polymers and to an improved process to prepare them.

BACKGROUND OF THE INVENTION

Low molecular weight polycarboxylic acid polymers and their salts are useful as dispersants, scale inhibitors, detergent additives, sequestrants, etc. Generally a molecular weight below 50,000 is necessary for effective performance and often very low molecular weights below 10,000 are most effective. It is common to use chain transfer agents in the polymerization reaction to produce low, and especially the very low, molecular weight polymers. Hypophosphorus acid or its salts (commonly sodium hypophosphite) are a particularly desirable chain transfer agent, chosen primarily because they introduce phosphinate and phosphonate functionality into water soluble polymer molecules which confers superior performance properties in some applications. As used hereinafter and in the appended claims the term "hypophosphorous acid" is intended to include salts thereof, unless a clearly different meaning is indicated. The use of hypophosphorous acid and its benefits have been taught in several U.S. Pat. Nos. 2,957,931, 4,046,707, 4,105,551, 4,127,483, 4,159,946 and 4,621,127.

Inefficiency is a problem that is common to all the prior use of hypophosphorous acid as a chain transfer agent. Much of the agent does not specifically become part of the transfer process. A significant portion is not incorporated into the polymer and remains unreacted or is converted to other inorganic species like phosphorus acid or its salts. As a consequence, high levels of hypophosphorous acid are required to obtain low molecular weight. Since hypophosphorous acid is a relatively expensive material, it becomes a costly route to low molecular weight polymers. In the case of preparing very low molecular weight polymers, the levels of hypophosphorous acid required may be prohibitively expensive.

A second disadvantage arising from the inefficiency is the significant amounts of unreacted hypophosphite or other inorganic residues present in the reaction product. These salts do not contribute to performance thereby diluting the activity of the reaction product. In some cases, such as preparing concentrated clay slurries, these salts can interfere with the dispersing process.

Another disadvantage of prior usage of hypophosphorous acid resides in the mix of polymer species formed. The reaction products include dialkyl phosphinate polymers and monoalkyl phosphinate and phosphonate polymers. In the prior art processes, only about 50% or less of the hypophosphorous acid is incorporated into the dialkyl species. Since the dialkyl species are believed to have greater biodegradability than the monoalkyls of equal molecular weight, the prior processes give products with relatively poor biodegradability.

SUMMARY OF INVENTION

An object of the invention is an improved process for preparing low molecular weight polycarboxylate polymers which makes efficient use of hypophosphorous acid as a chain transfer agent. Significantly reduced levels of this expensive chain transfer agent are required to achieve low molecular weight. The improved efficiency is obtained by means of inprocess neutralization of the carboxylic acid containing monomers during the polymerization reaction. The improved process comprises co-feeding of 20–100% equivalents of alkaline neutralizer along with the monoethylenically unsaturated mono or dicarboxylic acids optionally with some noncarboxylic acid monomer, hypophosphorous acid chain transfer agent, water soluble initiator and water to the reactor.

Another objective is providing a low molecular weight water soluble polycarboxylate polymer composition with high levels of dialkyl phosphinate polymers and low levels of unreacted or unincorporated hypophosphite or phosphite irorganic compounds where greater than 50% of the phosphorus present is in the dialkyl species and less than 20% is in inorganic phosphorus containing acids or salts.

Another object of the invention is providing phosphinatephosphonate containing polycarboxylate polymers with higher activity and improved biodegradability.

DETAILED DESCRIPTION OF THE INVENTION

It has been surprisingly found that when using hypophosphorous acid as the chain transfer agent, neutralization of carboxylic acid monomer(s) during polymerization has a major effect of the chain transfer efficiency. Co-feeding of 20–100 percent equivalents of an alkaline neutralizer with the acid monomer, the hypophorous acid, a water soluble initiator and water to the reactor will significantly increase the percent of the hypophosphite that enters into the chain transfer process and become incorporated into the polymer especially into dialkyl phosphinate polymer molecules.

The objective is preparing low molecular weight water soluble carboxylic acid based polymers containing phosphinate or phosphonate moieties incorporated into the polymer chain. Low molecular weight refers to a weight average molecular weight ($M_w$) or less than 50,000, preferably less than 20,000 and most preferably less than 10,000.

The process is aqueous based and can be run in a batch or a continuous or semicontinuous mode.

The monomers are principally monoethylenically unsaturated monocarboxylic and dicarboxylic acids. Examples of monocarboxylic acids useful in this invention are acrylic acid, methacrylic acid, vinyl acetic acid, and acryloxypropionic acid. Dicarboxylic acid monomer examples are maleic acid, itaconic acid, mesaconic acid, fumaric acid and citraconic acid. The anhydrides of the carboxylic acids such as maleic anhydride are also useful.

In addition, non carboxylic acid monomers may be present at levels where they are soluble in the reaction mixture and the produced polymer is soluble in water. In any case, the non carboxylic monomer is less than 80% and preferably less than 50% of the total weight percent of monomer charged. Examples of monoethylenically unsaturated monomers which are not carboxylic acids are alkyl esters of acrylic or methacrylic acid such as methyl, ethyl or butyl acrylate or methyl, butyl or isobutyl methacrylate, hydroxyalkyl esters of acrylic or methacrylic acids, such as hydroxyethyl or hydroxypropyl acrylate or methacrylate, acrylamide, methacrylamide, phosphoethyl methacrylate, allyl or methallyl alcohols, esters and ethers, acrylonitrile, vinyl acetate, styrene, vinyl sulfonic acid or salts thereof and 2-acrylamino-2-methyl propane sulfonic acid or salts thereof.

The chain transfer agent or chain regulator by the present invention is hypophosphorous acid or a salt thereof such as sodium hypophosphite monohydrate. The level used will vary with the desired molecular weight. The molecular weight produced is inversely proportional to the level of chain transfer agent. Levels as little as 1 percent (weight percent based on monomer) to as much as 75 percent or more may be used.

Suitable water soluble initiators include, but are not limited to, hydrogen peroxide, t-butyl hydroperoxide, sodium, potassium or ammonium persulfate, sodium, potassium or ammonium perphosphate and 2,2 azobis (cyanovaleric acid). These are normally used in amounts of 0.05% to 5% (based on weight of monomer(s)). A preferred range is 0.1-2%. Metal salt activators or promoters may be also be added as part of the initiator system. Examples include water soluble salts of cobalt, iron, copper, nickel, zinc, tungsten, cerium, molybdenum, titanium and zirconium. Preferred levels of metal salts are 0-100 ppm based on weight of monomer(s).

The alkaline neutralizer may be any inorganic or organic base. Among the preferred bases which may be used are sodium hydroxide, potassium hydroxide, ammonium hydroxide, triethanolamine, dimethyl amino ethanol, ethanolamine, and trimethyl hydroxyethyl ammonium hydroxide. The level of neutralizer would be 20 to 100 percent equivalents based on the acid or anhydride monomer content of the reaction mix. A preferred level of neutralizer is 50-95 percent equivalents.

The polymers produced are polyacrylates. The term "polyacrylates" is intended to mean polymers where one or more of the monomers polymerized is an acrylate or methacrylate but some non acrylate monomers may be included and even be present in a major amount.

Polymerizations are normally run at greater than 20% solids (nonvolatile solids in aqueous polymerized product) and preferably in the 30-80% solids range. Polymerization temperatures between 60°-150° C. are employed with a preferred range of 75°-100° C. A portion of the water is charged initially to the reactor. Each of the reactants is then co-fed; monomer chain transfer agent, initiator, and alkaline neutralizer are added separately and at a linear rate to the stirred water charge over a period of 0.5 to 10 hours. Linear feed rate refers to maintaining the same feed rate of reactants during the entire addition period. In a batch process, the polymerization is conducted until all ingredients have been added and complete polymerization has occurred as indicated by the solids content of the solution. If residual monomer levels are higher than desired, a longer hold period may be employed with optional addition of more initiator or other suitable monomer scavengers.

In a continuous or semi-continuous mode, continuous removal of a portion of the reaction mixture would be started after a portion of the reactants mixture would be started after a portion of the reactants had been added; after approximately 30 minutes for example. The co-feed of starting ingredients would then be continued at a rate equal to the discharge rate.

The initiator, chain transfer agent and alkaline neutralizer are normally added as aqueous solutions for simplicity and accuracy of metering and more uniform reaction. The reactants can be fed separately although some preblending may be practiced; blending of monomers or preneutralizing the acid monomer are examples of alternative modes by the present invention.

The purpose of employing hypophosphorous acid in the polymerization is two fold. One is to provide phosphinate and phosphonate functionality in the polymer molecule. It is well known that these groups can produce desirable performance for the polymer as, for example, in dispersing or water treatment applications. The second contribution arises from its chain transfer activity and is a means to control molecular weight and more specifically to provide low and, particularly very low molecular weight polymers. The reaction product formed is a mixture of species. NMR analysis indicates the composition consists of:

A-Polymeric
(1) Dialkyl phosphinate

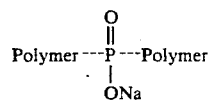

(2) Monoalkyl phosphinate

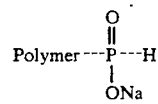

(3) Monoalkyl phosphonate

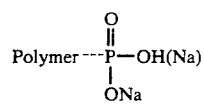

B-Inorganic
(4) Sodium hypophosphite

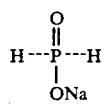

(5) phosphorus Acid (or salt)

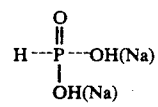

The ratio of the species present in the composition reaction mixture is a function of the process employed. As illustrated by the examples, the in-process neutralization process produces a mix that has less unincorporated inorganic compounds and more dialkyl polymer species than does the prior art processes not employing in-process neutralization. One means to describe the composition is on the basis of the percent of the total phosphorus that is in each of the species. Typical ratios for compositions by the process of the present invention versus the prior art process are:

| | % of phosphorus | |
|---|---|---|
| Compound | without in-process neutralization (Prior Art) | in process neutralization (the invention) |
| Dialkyl phosphinates | 45 | 72 |
| Monoalkyl phosphinates and phosphonates | 25 | 18 |
| Inorganic | 30 | 10 |

As will be illustrated in the examples given hereinafter, most of the phosphorus is in a useful form, that is, is reacted with the dialkyl and monoalkyl polymers of the present invention. The polymer mixtures are therefore improved over those available heretofore by the prior art processes. Under the preferred conditions of the invention, depending upon the amount of acid groups neutralized in-process, the dialkyl phosphinates will usually contain 50–90% of the total phosphorus. The monoalkyl phosphinates and phosphonates contain between 10% and 40% phosphorus with the remainder, if any, in the inorganic salts.

BRIEF DESCRIPTION OF THE DRAWINGS

This invention will now be more fully explained with reference to FIGS. 1 and 2 appended hereto.

Figure 1:
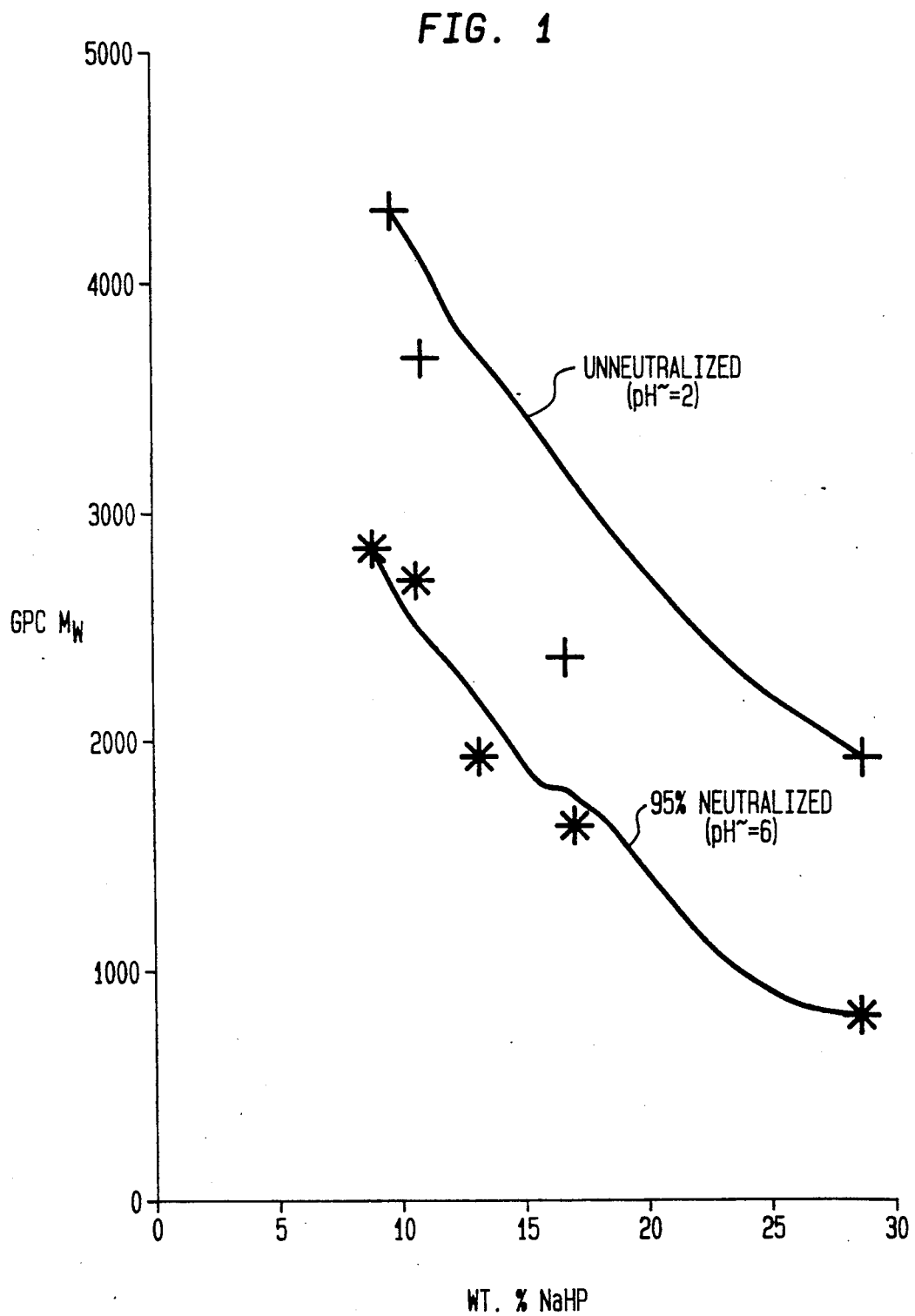
FIG. 1 is a graph of the molecular weight of polyacrylic acid polymers produced using various weight percents of sodium hypophosphite versus the weight percent of the sodium hypophosphite used. Two processes are exemplified in FIG. 1; without neutralization, at pH of about 2; and with about 95 percent neutralization at pH of about 6.

The relationship of level of chain transfer agent to molecular weight of the polymer produced is illustrated in FIG. 1 for the two processes. In the prior art process without neutralization, ("UNNEUTRALIZED" in FIG. 1) the molecular weight will decrease with increasing level of sodium hypophosphite ("NaHP"). It requires, for example, about 30% NaHP (based on monomer) to produce a polymer with a weight average molecular weight ($M_w$) of approximately 2000. In the present invention employing in process neutralization (95% equivalents for pH about 6) about 13% NaHP or less than one half as much, is required to produce a polymer with a $M_w$ of about 2000.

$M_w$ is determined by aqueous gel permeation chromatography (GPC).

Figure 2:
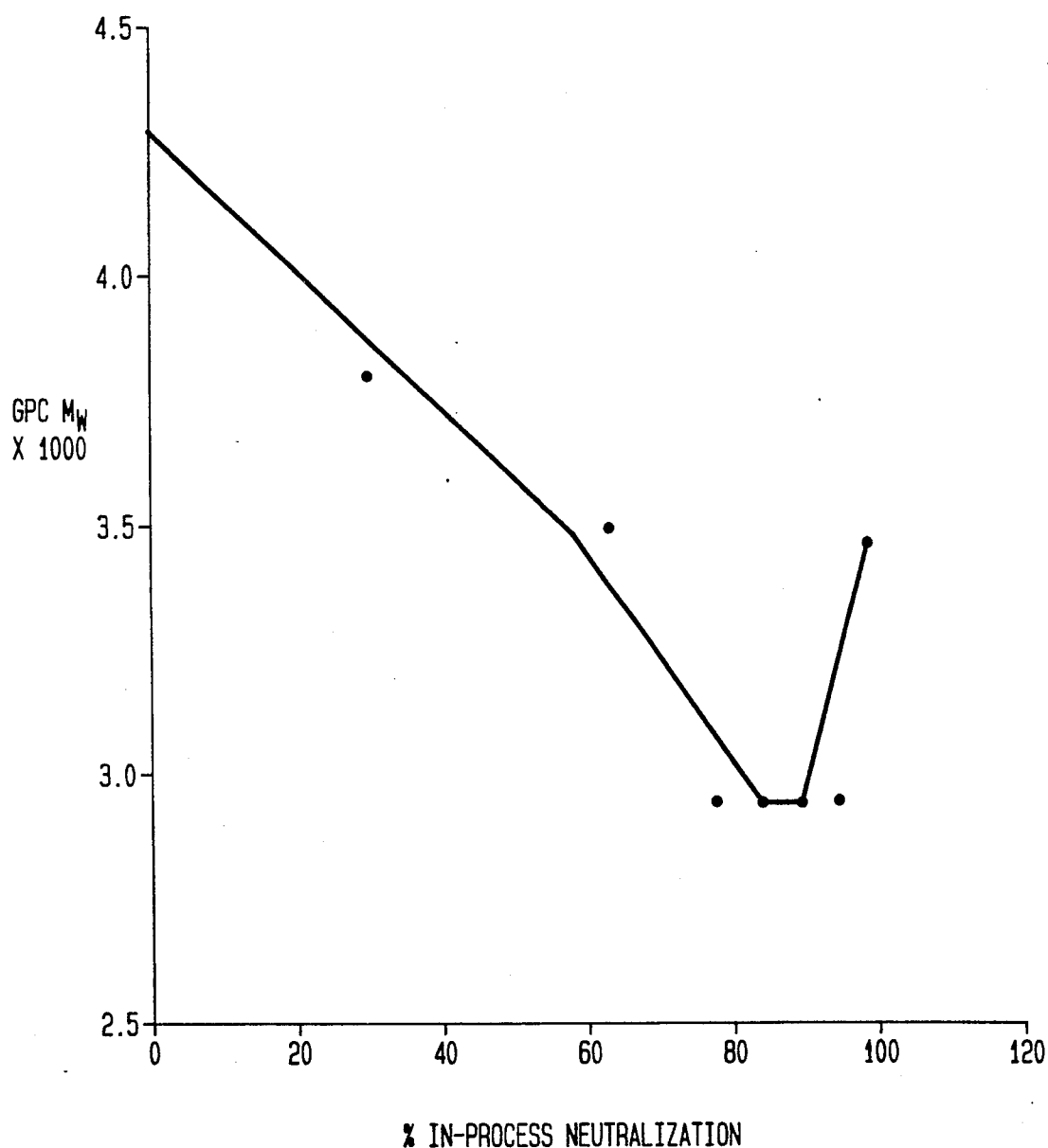
FIG. 2 is a graph of the molecular weight of polyacrylic acid polymers produced using 7.4 percent sodium hypophosphite at various percent of in-process neutralization versus the percent in-process neutralization.

The effect of degree of in process neutralization (percent equivalents of alkaline neutralizer based on acrylic acid monomer) is depicted in FIG. 2. At a given level of NaHP, the extent to which $M_w$ is lowered is directly related to the efficiency of utilization of the NaHP. Over the range of 20 to 100 percent equivalents of alkaline neutralizer, the $M_w$ is significantly lower than the prior art process.

The compositions with the high dialkyl polymer and low inorganic compounds content are more useful in a number of end use applications including dispersants for paint formulations, additives for laundry and machine dishwashing detergents, dispersants for kaolin clay slurries and scale inhibitors, dispersants and corrosion inhibitors for water treatment and oil production.

The following specific examples are intended to illustrate various embodiments of the invention but are not intended to otherwise limit the scope of the broader aspects of the invention.

EXAMPLE 1

To a two liter four neck flask equipped with a mechanical stirrer, a condenser, a thermometer and inlets for the gradual additions of monomer, alkaline neutralizer, initiator and sodium hypophosphite solutions, was added 566 grams of deionized (DI) water. The water was heated to 90° C. A monomer charge of 500 grams of glacial acrylic acid was prepared. A neutralizer co-feed charge of 528 grams of 50% sodium hydroxide (95 equivalent percent based on the acid monomer) was prepared. A chain regulator co-feed solution was prepared by dissolving 36.8 grams of sodium hypophosphite monohydrate in 40 grams of DI water. An initiator solution was prepared by dissolving 5 grams of sodium persulfate in 58 grams of DI water.

The acrylic acid, sodium hydroxide, sodium persulfate and sodium hypophosphite charges were added linearly and separately over three hours to the stirring water charge. Temperature was maintained at $90° +/- 2°$ C.

The resultant polymer solution had a solids content of 41%, pH of 6.7, viscosity of 210 centipoises and residual monomer content of less than 0.01%. Molecular weight by GPC was $M_w$ 2700.

NMR analysis shows the composition was a mixture of dialkyl phosphinate polymer, monoalkyl phosphinate polymer, monoalkylphosphonate polymer, sodium hypophosphate and sodium phosphite in water in which 72% of the phosphorus was incorporated in the dialkyl species, 18% in the monoalkyl species and 10% in the inorganic salts.

EXAMPLE 2

The procedure of Example 1 was repeated except that the amount of DI water added to the reactor was 393 grams and the co-feed alkaline neutralizer was 400 grams of ammonium hydroxide (28% ammonia).

The resultant polymer solution had a solids content of 43%, pH 6.5, viscosity of 90 centipoises; residual monomer of less than 0.01%, a molecular weight $M_w$=2800.

EXAMPLE 3

The procedure of Example 1 was repeated except that no co-feed neutralizer was added during the polymerization. When the polymerization was completed, however, 528 grams of 50% sodium hydroxide solution was added to neutralize the polymer solution.

The resultant polymer solution had a solids content of 42%, pH 6.5, residual monomer of less than 0.01%, and $M_w$=4320.

NMR analysis shows the composition was a mixture of the same species as in Example 1 but with a different ratio. Of the total phosphorus present, 45% was incorporated into dialkyl phosphinate polymer, 25% in monoalkyl phosphinate and phosphonate polymer and 30% not incorporated in the polymer.

EXAMPLE 4

The procedure of Example 1 was repeated except that the sodium hypophosphite monohydrate charge was increased to 73.6 grams dissolved in 80 grams of DI water.

The resultant polymer solution had 42% solids, pH 6.5, residual monomer of less than 0.01% and $M_w = 1800$.

The resultant polymer solution had a solids content of 42%; the pH=6.5. Residual AA was <0.01%. The polymer molecular weight based on GPC measurement was Mw=1800. NMR analysis showed that 75% of the phosphorus was incorporated as dialkyl phosphonate polymer, 22% as monoalkyl phosphinate and prosphonate polymer and less than 3% in the inorganic salts.

EXAMPLE 5

The procedure of Example 3 with no co-feed neutralizer was repeated except that the sodium hypophosphite monohydrate charge was increased to 73.6 grams dissolved in 80 grams of DI water.

The resultant polymer solution had 41% solids, pH 6.5, residual monomer <0.01% and $M_w=2300$.

NMR analysis showed that the percent of phosphorus in the product was about 40% in dialkyl phosphonate polymer, about 25% in monoalkyl phosphinate and phosphonate polymer and about 35% not incorporated in polymer.

EXAMPLE 6

To a two liter, four neck flask equipped with a mechanical stirrer, a condenser, a thermometer and inlets for gradual additions of monomers, alkaline neutralizer, initiator and sodium hypophosphite solutions was added 206 grams of DI water and 20 grams of a 0.15% solution of iron sulfate heptahydrate dissolved in DI water. This solution was heated to 90° C. A monomer solution of 325 grams of glacial acrylic acid, 175 grams of maleic anhydride and 200 grams of DI water was prepared. An alkaline neutralizer co-feed of 451.6 grams of 50% sodium solution (75% equivalent percent based on monomers) and 100 grams of DI water was prepared. A chain regulator co-feed solution was prepared by dissolving 27.6 grams of sodium hypophosphite monohydrate in 66 grams of DI water. An initiator solution was prepared by dissolving 5 grams of sodium persulfate in 80 grams of DI water.

The monomers, sodium hydroxide, sodium persulfate and sodium hypophosphite charges are added linearly and separately over three hours to the stirring water charge. Temperature was maintained at 90°+/−2° C.

The resultant polymer solution had 42% solids, pH 5.5, viscosity of 141 centipoises, residual acrylic acid was 0.12% and residual maleic acid was 1.03%. $M_w=2800$.

EXAMPLE 7

The procedure of Example 6 was repeated except that 330 grams of DI water was added, the monomer feed is 596 grams of glacial methacrylic acid, the alkaline neutralizer co-feed is 278 grams of 50% NaOH (50 equivalent % based on monomer) in 289 grams of DI water and the chain regulator co-feed was 36.8 grams of sodium hypophosphite monohydrate in 80 grams of DI water.

The resultant polymer solution had 42% solids, pH 5.3, viscosity of 490,000 centipoises, residual momomer of 0.11% and $M_w=25,200$.

EXAMPLE 8

The procedure of Example 1 was repeated except that 200 grams of DI water was initially added to the reactor. The monomer feed was 288 grams of glacial acrylic acid. The initiator solution was 4 grams of sodium persulfate and 50 grams of DI water. The chain regulator solution was 212 grams of sodium hypophosphite monohydrate and 212 grams of DI water. The alkaline neutralizer co-feed was 304 grams of 50% sodium hydroxide solution (95 equivalent % based on monomer).

The resultant polymer solution had 46% solids, pH 6.3, viscosity of 35 centipoises, residual monomer of <0.01% and $M_w=729$.

EXAMPLE 9

The procedure of Example 1 was repeated except that 18.5 grams of sodium hypophosphite monohydrate was used.

The resultant polymer composition had a molecular weight of $M_w=5670$.

EXAMPLE 10

The procedure of Example 1 is repeated except that the monomer charge is 300 grams of glacial acrylic acid and 200 grams of 2-hydroxyethyl acrylate and the neutralizer co-feed charge is 317 grams of 50% sodium hydroxide (95 equivalent percent).

The resultant polymer solution has a solids content of 42%, pH of 6.8 and $M_w=2800$.

EXAMPLE 11

The procedure of Example 1 is repeated except that the monomer charge is 100 grams of glacial acrylic acid, 200 grams of hydroxyethyl acrylate and 200 grams of acrylamide and the neutralizer co-feed charge is 106 grams of 50% sodium hydroxide (95 equivalent percent).

The resultant polymer has a $M_w=2800$.

EXAMPLE 12

A three-residence time semi-continuous run is illustrated in this example.

To a two liter, 4 necked flask fitted with a bottom outlet and top inlets for gradual addition of monomer, alkaline neutralizer, initiator and chain transfer agent was added 474 grams of DI water. This water charge was heated to 91°±1° C.

A monomer feed of 1939 grams of glacial acrylic acid was prepared. An initiator-activator co-feed mixture consisting of 19.4 grams of sodium persulfate and 0.03 grams of ferrous sulfate in 226 grams of DI water, was prepared. A chain regulator co-feed solution of 143 grams of sodium hypophosphite monohydrate in 194 grams of DI water was prepared. An alkaline neutralizer co-feed solution of 2055 grams of 50% sodium hydroxide was prepared.

The hypophosphite feed was started for five minutes, then one third of each of the feeds was added linearly and separately, over 90 minutes, while maintaining reaction temperature of 91°±1° C. After 90 minutes, an additional co-feed of DI water (948 grams) was started and added linearly over 180 minutes. Simultaneously with the start of the water co-feed, product removal was started at a rate that maintained a total reactor weight of about 2008 grams. The monomer, initiator, chain regulator and alkaline neutralizer additions were maintained as their original rates, and the remaining two thirds of these charges were co-fed over the next 180 minutes. After a total elapsed time of 270 minutes (not including the five minute chain regulator start up charge), all the feeds were finished and the product in the reactor was allowed to drain from the reactor. The product was held at 85° C. to further reduce residual monomer.

The resultant polymer solution had 45% solids, pH 7.3, residual monomer of 0.0037% and a molecular weight, $M_w = 2800$.

We claim:

1. An improved low molecular weight water soluble acrylate polymer mixture containing:

A-Polymeric Dialkyl Phosphinates

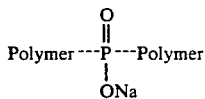

B-Polymeric Monoalkyl Phosphinates

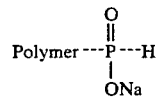

C-Polymeric Monoalkyl Phosphonates

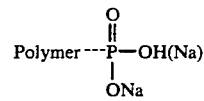

together with inorganic salts wherein at least 80% of the phosphorus is contained in the polymers with the remainder in the inorganic salts.

2. The polyacrylate mixture of claim 1 wherein at least 90% of the phosphorus is contained in the polymer.

3. The polyacrylate mixture of claim 1 wherein at least 70% of the phosphorus is present as dialkyl phosphinates.

* * * * *